United States Patent [19]

Stansbury, Jr. et al.

[11] Patent Number: 4,692,051
[45] Date of Patent: Sep. 8, 1987

[54] HOT WATER HEATER KNOB ADAPTOR

[76] Inventors: Benjamin H. Stansbury, Jr., 803 N. Doheny Dr., Beverly Hills, Calif. 90210; Richard E. Henderson, 1760 Monrovia, Unit B10, Costa Mesa, Calif. 92627

[21] Appl. No.: 446,884

[22] Filed: Dec. 6, 1982

[51] Int. Cl.$^4$ .............................................. F16D 1/00
[52] U.S. Cl. ...................................... 403/3; 403/287; 74/553; 16/121
[58] Field of Search ................. 403/4, 287, 3; 74/553; 16/121; 81/124.4, 124.6

[56] References Cited

U.S. PATENT DOCUMENTS

| 1,829,371 | 10/1931 | Ross | 403/3 |
| 1,923,691 | 8/1933 | Schornstein | 16/117 X |
| 1,936,109 | 11/1933 | Frank | 403/3 |
| 2,054,978 | 9/1936 | Hoelscher | 81/124.4 X |
| 2,191,304 | 2/1940 | Ashendorf | 74/553 X |
| 2,291,944 | 8/1942 | Bonanno | 403/3 |
| 3,635,106 | 1/1972 | Homs | 81/124.6 |
| 3,791,402 | 2/1974 | Schuler | 16/121 X |
| 4,016,402 | 4/1977 | Scott | 219/334 |
| 4,166,944 | 9/1979 | Scott | 219/334 X |

Primary Examiner—Andrew V. Kundrat
Attorney, Agent, or Firm—Ralph S. Branscomb

[57] ABSTRACT

An adapter consists of a more or less cylindrical body having a rear outer portion and a front inner portion, projections (or other suitable coupling means) on the rear outer portion for effecting the coupling to an automatic adjusting device, and at least three different recessed configurations located at different depths within the body's front inner portion for mating respectively to at least the three most common types of residential thermostat knobs. The most recessed configuration receives the smallest such knob, which is of the "lever" type. The middle configuration is a circular ring of inwardly projecting teeth for engaging the intermediate size "serrated" type of knob. The least recessed configuration is of an internal bevelled shape for receiving the largest such knob, namely the "bevel" knob. These various recessed configurations are so located and dimensioned with respect to the body of the adaptor to allow each type of knob to reach and mate with its corresponding recessed configuration.

5 Claims, 3 Drawing Figures

HOT WATER HEATER KNOB ADAPTOR

BACKGROUND OF THE INVENTION

1. Field

This invention relates to adaptors, and in particular, to an adaptor facilitating the coupling of an automatic adjusting mechanism with a hot water heater thermostat.

2. Prior Art

U.S. Pat. Nos. 4,016,402 and 4,166,944 to Scott describe energy conserving systems for automatically adjusting a hot water heater thermostat to a lower temperature during periods of low use and a higher temperature during periods of high use. Such systems utilize a device which engages a rotatable lever (or other mechanical component of similar function) attached to the thermostat. Raising or lowering the end of such a lever (or other similar component) thus results in rotating motion which changes the thermostat setting. Most residential hot water heater thermostats do not contain such a lever, but only a more or less plain knob of one of at least three quite different configurations, and thus those energy conserving system cannot be readily coupled to the typical hot water heater thermostat without further apparatus in the form of a custom mechanical interface.

SUMMARY OF THE INVENTION

The invention comprises a universal adaptor that serves as the link between an automatic adjusting mechanism and the knob of a thermostat control box. The adaptor can engage three control box knob configurations: "bevel", "lever", and "serrated". The invention is particularly useful in conjuction with the invention described in co-pending applications Ser. No. 06/531,998. "Energy Conserving Water Heater Control System", which discloses an energy conserving hot water heater control system which regulates the temperature of heated water as a function of the difference between inlet and outlet pipe temperatures and thereby avoids the necessity for recalibrating the system for use on different makes and types of hot water heaters.

Briefly, the invention is directed to an adaptor consisting of a more or less cylindrical body having a rear outer portion and a front inner portion, projections (or other suitable coupling means) on the rear outer portion for effecting the coupling to an automatic adjusting device, and at least three different recessed configurations located at different depths within the body's front inner portion for mating respectively to at least the three most common types of residential thermostat knobs. The most recessed configurations receives the smallest such knob, which is of the "lever" type. The middle configuration is a circular ring of inwardly projecting teeth for engaging the intermediate size "serrated " type of knob. The least recessed configuration is of an internal bevelled shape for receiving the largest such knob, namely the "bevel" knob. These various recessed configurations are so located and dimensioned with respect to the body of the adaptor to allow each type of knob to reach and mate with its corresponding recessed configuration.

DETAILED DESCRIPTION OF THE INVENTION

The invention can be understood best by examining the following description of a preferred embodiment in conjunction with the attached drawings to which it relates.

Figure 1:
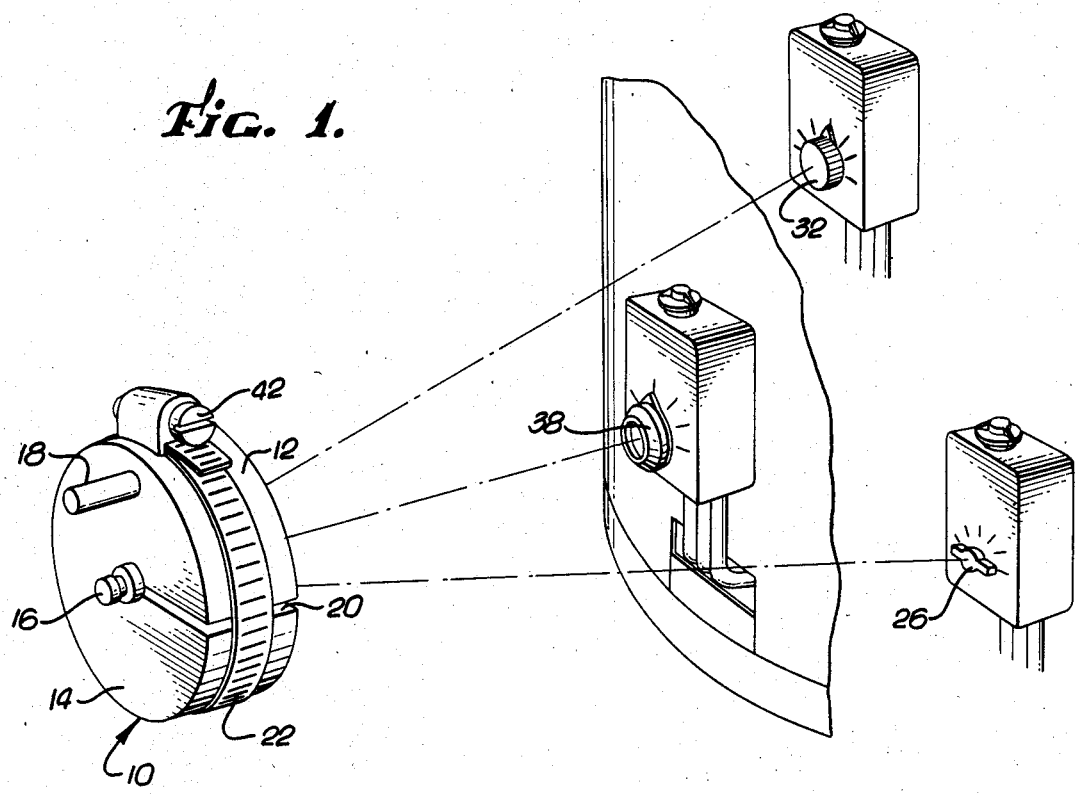
FIG. 1 is an isometric view displaying the rear outer portion of the adaptor as well as the external knob configurations of the three most common types with which it mates.

FIG. 1 displays the adaptor designated generally as 10. The adaptor 10 includes a cylindrical body 12 having a rear outer portion 14. Body 12 and rear outer portion 14 are preferably formed of one piece of plastic material or the like. Pivot point 16 projects from the center of rear outer portion 14 and together with shaft 18 facilitates the coupling of adaptor 10 to an automatic adjustment mechanism not shown. Alternate means of coupling the adaptor to the adjusting mechanism may be a pair of diametrically opposed openings or a single shaped keyway in said outer portion, or a pair of diametrically opposed shafts projecting from said outer portion.

Radial slot 20 allows the circumference of the adaptor to be decreased slightly in order to snugly fit the thermostat knob to which the adaptor is to be mated. Tension ring clamp 22 (or other suitable tensioning means) squeeze cylinder 12 thereby reducing the width of slot 20 and tightening adaptor 10 on the thermostat control knob. Tension ring clamp 22 may be a hose clamp as shown in FIG. 1 or may be any other band with a suitable tensioning mechanism; alternately, an adjusting screw perpendicular to slot 20 may be employed as the tensioning means.

Figure 2:
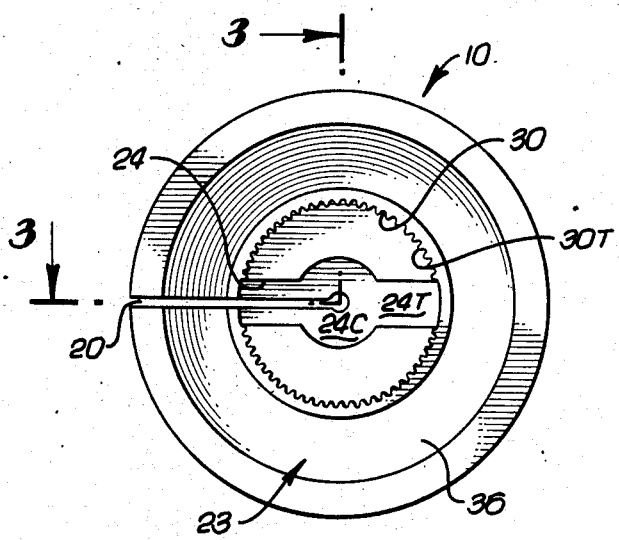
FIG. 2 is a front elevational view of the adaptor of FIG. 1 and shows the three internal recessed engagement configurations provided in profile.
Figure 3:
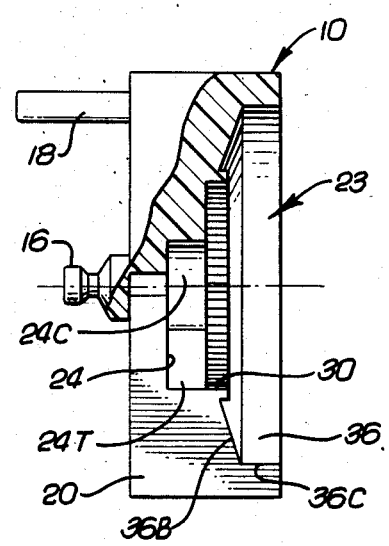
FIG. 3 is a side elevational view of the adaptor of FIG. 2 taken along with section line label 3—3 displaying those three engagement configurations in profile.

Referring now to FIGS. 2 and 3 in combination, the front of inner portion 23 of adaptor 10 can be seen together with the three internal recesses 24, 30, and 36, coaxial with one another and with the adaptor body. Innermost recess 24 is configured for receiving a "lever" type of knob (shown in FIG. 1 with the designation numeral 26) and may be described generally as a hollow cylinder 24C having two outwardly projecting hollow rectangular tabs 24T. The middle internal recess is in the shape of a serrated ring 30 having inwardly projecting teeth 30T about its periphery, and is configured for engaging the "serrated" type of knob 32 also shown in FIG. 1. FIG. 3 exhibits the respective positions of "lever" recess 24 interior of and below circular serrated ring recess 30. The recess which is configured for receiving a "bevel" type of knob (designated 38 in FIG. 1) is seen in profile in FIG. 3 and designated by reference numeral 36. It comprises a cylindrical portion 36C and an adjoining frusto-conical portion 36B.

It can be seen that a standard lever type of water heater thermostat knob 26 wil slip past the bevelled recess 36 and serrated ring recess 30 to engage conformingly with lever configured recess 24. Likewise, the serrated type of knob 32 will slip past the bevelled configurations 36 to engage with the surrated ring recess configuration 30. The "bevel" type of knob 33, being the widest of the various types, will engage directly with the bevelled configuration 36. Thus the adaptor can be used with equal ease with any of the three standard types of residential water heater thermostat control knobs, and is thus truly a "universal" adapter.

In order to attach adapter 10 to one of the control knobs 26, 32, or 38, clamp 22 is lossened by rotating screw 42 counterclockwise. The adaptor can then be slipped on any of the three differen types of water heater thermostat knob configurations described above. Screw 42 is then rotated clockwise in order to tighten clamp 22, thereby squeezing slot 20 and securing adapter snugly upon the thermostat knob. The knob engagement device (not shown) of the automatic adjustment system is then coupled to adapter 10-by means of pivot 16 and shaft 10 (or other coupling means). Rotation of the engagement device thus causes adapter 10 to rotate and with it the knob to which the adapter is attached.

What is claimed is:

1. An adapter for coupling an automatic adjusting mechanism to different configurations of manual control knobs comprising:
   (a) coupling means on a rear portion of said adapter for coupling said adapter to said mechanism;
   (b) recess means on an internal front portion of said adapter for matingly receiving said different external configurations;
   (c) tensioning means for securing said adapter snugly upon the relevant control knob, such that said adapter and said knob rotate one with the other; and
   (d) said tensioning means applying a radially inwardly directed gripping force on said relevant control knob to secure said adpater upon same.

2. An adapter for coupling an automatic adjusting mechanism to different configurations of manual control knobs comprising:
   (a) coupling means on a rear portion of said adapter for coupling said adapter to said mechanism;
   (b) recess means on an internal front portion of said adapter for matingly receiving said different external configurations, said recess means comprising:
      (i) an innermost internal recess positioned at a predetermined depth configured to engage with a "lever" type of control knob;
      (ii) a middle internal recess coaxial with said innermost recess and positioned at a depth shallower thereto, configured to engage with a "serrated" type of control knob; and
      (iii) an outermost internal recess coaxial with said middle recess and positioned at a depth shallower thereto configured to engage with a "bevel " type of control knob.

3. An adapter as in claim 2, wherein said coupling means comprises a shaft having an axis removed from that of the adapter body, the axes of said shaft and said body being parrallel to one another.

4. An adapter as in claim 2, wherein said tensioning means comprises:
   a radial slot in the body of said adapter; and
   squeezing means for reducing the width of said slot.

5. An adapter comprising a coupling means and a body, the front portion of said body defining a hollow recess in the shape of (a) a first smallest diameter cylinder having two rectangular tabs extending radially therefrom, above which is (b) a ring of a second intermediate diameter having a plurality of inwardly projecting teeth, above which in turn is (c) an internally beveled configurations formed of a cylindrical portion of a largest third diameter above and adjoining a frustro-conical portion.

* * * * *